(12) United States Patent
Edmonds

(10) Patent No.: US 7,012,576 B2
(45) Date of Patent: *Mar. 14, 2006

(54) INTELLIGENT DISPLAY INTERFACE

(75) Inventor: Raymond C. Edmonds, Manitou Springs, CO (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,598

(22) Filed: Dec. 29, 1999

(65) Prior Publication Data

US 2002/0118144 A1 Aug. 29, 2002

(51) Int. Cl.
*G09G 5/00* (2006.01)

(52) U.S. Cl. .................... 345/1.1; 345/1.3; 345/538; 348/739

(58) Field of Classification Search ............... 345/213, 345/214, 698, 99, 212, 1.1, 3.1, 2.2, 532, 345/536, 538, 1.3; 348/739, 740
See application file for complete search history.

(56) References Cited

U.S. PATENT DOCUMENTS

| | | | | | |
|---|---|---|---|---|---|
| 4,965,559 | A | * | 10/1990 | Dye ............................ 345/2.2 |
| 5,046,027 | A | * | 9/1991 | Taaffe et al. ................ 364/521 |
| 5,159,449 | A | * | 10/1992 | Allmendinger .......... 348/390.1 |
| 5,384,643 | A | * | 1/1995 | Inga et al. ................... 358/403 |
| 5,426,513 | A | * | 6/1995 | Scorse et al. .......... 358/426.02 |
| 5,457,675 | A | * | 10/1995 | Suzuki et al. .................. 386/69 |
| 5,459,842 | A | * | 10/1995 | Begun et al. ................ 711/155 |
| 5,828,361 | A | * | 10/1998 | Gibson ........................ 345/600 |
| 5,926,155 | A | * | 7/1999 | Arai et al. ..................... 345/10 |
| 5,930,473 | A | * | 7/1999 | Teng et al. .................. 709/204 |
| 5,945,972 | A | * | 8/1999 | Okumura et al. ............. 345/98 |
| 5,977,945 | A | * | 11/1999 | Ohshima ..................... 345/100 |
| 6,078,349 | A | * | 6/2000 | Molloy ........................ 348/15 |
| 6,111,598 | A | * | 8/2000 | Faris ............................ 348/57 |
| 6,118,413 | A | * | 9/2000 | Bril et al. .................... 345/596 |
| 6,195,128 | B1 | * | 2/2001 | Streater ................. 375/240.12 |
| 6,262,705 | B1 | * | 7/2001 | Inoue et al. ................. 345/100 |
| 6,310,814 | B1 | * | 10/2001 | Hampel et al. ............. 365/222 |
| 6,323,854 | B1 | * | 11/2001 | Knox et al. .................. 345/418 |
| 6,343,313 | B1 | * | 1/2002 | Salesky et al. ............. 709/204 |
| 6,384,846 | B1 | * | 5/2002 | Hiroi ........................... 345/794 |
| 6,388,654 | B1 | * | 5/2002 | Platzker et al. ............. 345/156 |
| 6,397,275 | B1 | * | 5/2002 | Clapp et al. ................... 710/60 |
| 6,407,730 | B1 | * | 6/2002 | Hori ............................ 345/100 |

(Continued)

FOREIGN PATENT DOCUMENTS

JP 55-009276 * 1/1980

*Primary Examiner*—Xiao Wu
*Assistant Examiner*—Abbas Abdulselam
(74) *Attorney, Agent, or Firm*—Blakely, Sokoloff, Taylor & Zafman LLP

(57) ABSTRACT

A video display system that co-locates a video display memory with the video display device, and transmits to the display device those portions of the image data that have changed rather than continually updating the entire video image. Each display device is addressable, allowing multiple display devices showing different images to be updated through a single display controller port over a single bus or over a single daisy-chain connection. The image data can be updated synchronously or asynchronously, and display devices using different formats can share the same bus or cable.

25 Claims, 2 Drawing Sheets

U.S. PATENT DOCUMENTS 6,411,302 B1 * 6/2002 Chiraz ........................ 345/545
6,501,441 B1 * 12/2002 Ludtke et al. ............... 345/1.1
6,643,697 B1 * 11/2003 Eves et al. .................. 709/225
6,681,001 B1 * 1/2004 Clayton et al. .......... 379/93.05

* cited by examiner

INTELLIGENT DISPLAY INTERFACE

BACKGROUND OF THE INVENTION

1. Field of the Invention

The invention relates generally to video displays. More specifically, it relates to updating the data used in video displays.

2. Description of the Related Art

Most modern display devices rely on cathode ray tube (CRT) technology, which requires that any illuminated spot on the display must be constantly regenerated, or refreshed, to keep it from fading away. To avoid the perception of flicker, the entire image is typically refreshed (redrawn) at least 60 times per second, and 75–85 times per second is common. For a high-resolution digital color image, these considerations may require that a signal containing the equivalent of hundreds of millions of bits per second of video data be continuously delivered to the CRT to keep the image on the display screen. This is true even if the image is static, meaning the image itself does not change.

FIG. 1 shows a conventional computer-driven display system. Graphics controller 12 contains video memories 17, 19, which contain digitized data representing the images being displayed on displays 16, 18. Graphics controller 12 is co-located with a computer (not shown), so the computer can update the video memories 17, 19 over a standard high-speed data bus. Image data is repeatedly read from video memory 17 and continuously delivered to display device 18 over video cable 14. In a like manner, separate image data is repeatedly read from video memory 19 and continuously delivered to display device 16 over video cable 15. The data traveling through each cable is a serial bit stream or analog signal representing the actual image, and is formatted for the particular display device. Therefore, only one image may be transmitted over a particular cable and separate cables are run if different images are to be simultaneously displayed on different display devices. Separate cables are also run if the same image is to be simultaneously displayed on different types of display devices requiring differently formatted signals. If the display devices are very far from the graphics controller (such as flight status monitors scattered throughout an airport), the cost of running these multiple cables can be excessive. In addition, the graphics controller has separate connectors for each cable and separate video driver circuits for each connector, thus adding to the cost of the graphics controller itself.

In recent years, flat panel displays have begun to replace CRT technology for display devices, allowing image data to be transmitted to the display in different formats than that required by CRTs. However, the nature of the technologies used in flat panels still requires repetitive refresh of the image. Even though the refresh rate for a static image might be improved for a flat panel over that of a CRT, moving pictures require the displayed image to be repeatedly changed for all display technologies, and conventional techniques repeatedly refresh the entire image to accomplish motion in the image.

The need to constantly refresh the entire image creates more expensive graphics controllers, excessive cable requirements, and a large bandwidth requirement between the graphics controller and the display.

SUMMARY OF THE INVENTION

An embodiment of the invention pertains to a method of displaying an image by transmitting a portion of video image data to a video memory in a display device, and then updating the video memory with the portion. The portion contains video data representing a part of the video image data that has changed since a previous transmission to the display device

DETAILED DESCRIPTION OF THE INVENTION

Figure 1:
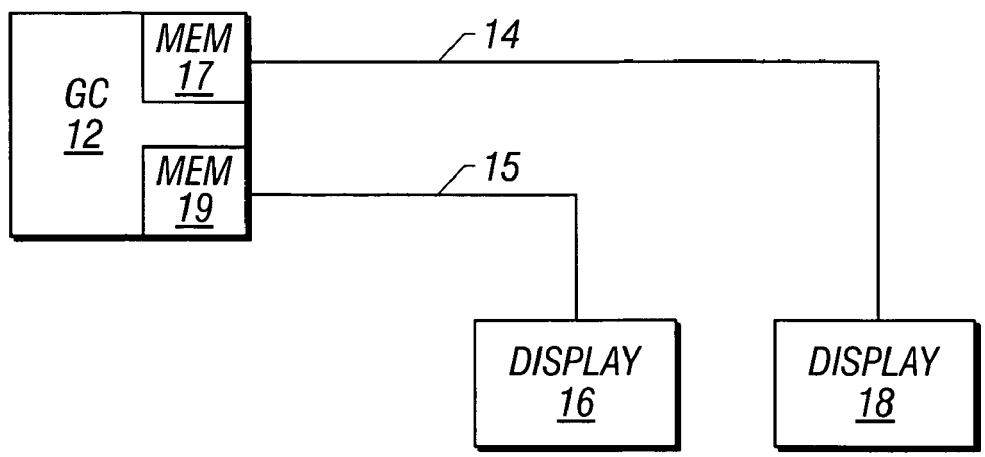
FIG. 1 shows a block diagram of a prior art system.
Figure 2:
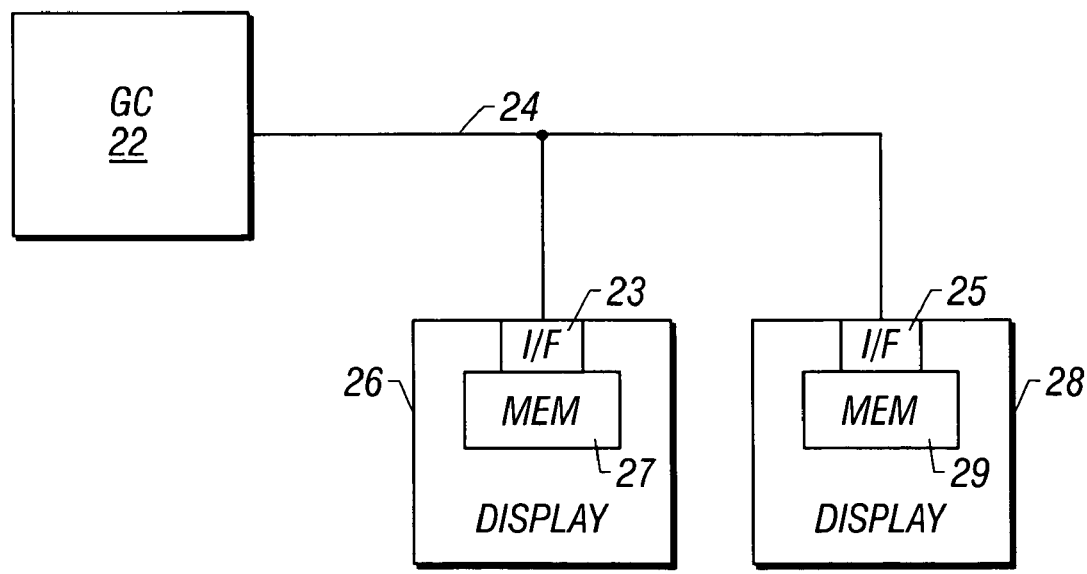
FIG. 2 shows a block diagram of an embodiment of a system of the invention.

FIG. 2 shows a system 21 of the invention, containing a graphics controller 22 and a communication channel 24 connecting graphics controller 22 to display devices 26 and 28, which contain video memories 27 and 29, respectively. Although only two video display devices are shown, more display devices can be implemented on the same communications channel 24. Video memories 27, 29 each contain the image data for displaying a separate image on the associated display device 26, 28. Interface circuits 23, 25 are designed to receive the particular data format being used for their respective display device, and place the received video data into the respective video memory. Communications channel 24 can take various forms, such as a bus or a daisy-chained cable. For a bus, each interface circuit 23, 25 receives the same data over the bus at approximately the same time. Each interface circuit has an assigned address, and accepts only those data transmissions from graphics controller 22 which contain that address. Transmissions with any other address are ignored by that device. If communications channel 24 is in the form of a daisy chain, interface 23 can receive a communication from graphics controller 22 and retransmit the communication to interface 25 over a daisy-chain connection. Again, each display accepts only transmissions containing its address and ignores or passes on transmissions addressed to other devices. Both bus and daisy-chain connections are well known in the art. Either may be implemented with serial or parallel data transmission. Communications channel 24 can also be implemented as a wireless channel using radio or optical signals. The nature of the protocol makes the invention transparent to the medium being used.

In operation, controller 22 can initially transmit the data for a first entire image to display device 26 and the data for a second entire image to display device 28. Subsequently, controller 22 may transmit only those portions of the first image that have changed since the previous transmission to device 26, and transmit only those portions of the second image that have changed since the previous transmission to device 28. Under these conditions, the bandwidth needed on communications channel 24 is decoupled from the refresh rate (how many times per second the image must be refreshed), and instead is tied to how much of the image must be modified, how often it must be modified, and how many images are sharing the channel. In a typical moving picture display, only a small portion of an image changes from one frame to the next, so only a small portion of the image must be replaced. In addition, the human eye and brain attempt to fill in the gaps when an object is moved from one location to the next in successive video frames. The result is the appearance of smooth movement even if successive updates are more than ⅓₀ of a second apart in time. This slower update rate, combined with updating less information per update, results in a much smaller bandwidth requirement for the channel carrying data to the display.

The addressability of display devices 26, 28 allows all transmissions to devices 26, 28 (and additional devices if implemented) to take place over the same communications channel. Since each display device imposes a smaller bandwidth requirement on the communications channel than is normally required, multiple display devices can share a single channel without increasing the bandwidth requirements normally imposed by a single device. This is true regardless of whether the communications channel is in the form of a bus, a cable, a radio channel or some other form. This also permits a single port from the graphics controller to interface with multiple display devices, reducing the cost and space requirements of the graphics controller.

Updates to a specific display device can be transmitted at predefined intervals or at irregular intervals, such as whenever sufficient video data has changed since the last update. A single update might be limited to only those pixels that have changed. Alternately, multi-pixel blocks of data may be considered, and a block may be updated if any pixel within it has changed. Various data formats can be used, and different display devices with different format requirements can share the same channel since the various formats can be imbedded into the same communications protocol.

Figure 3:
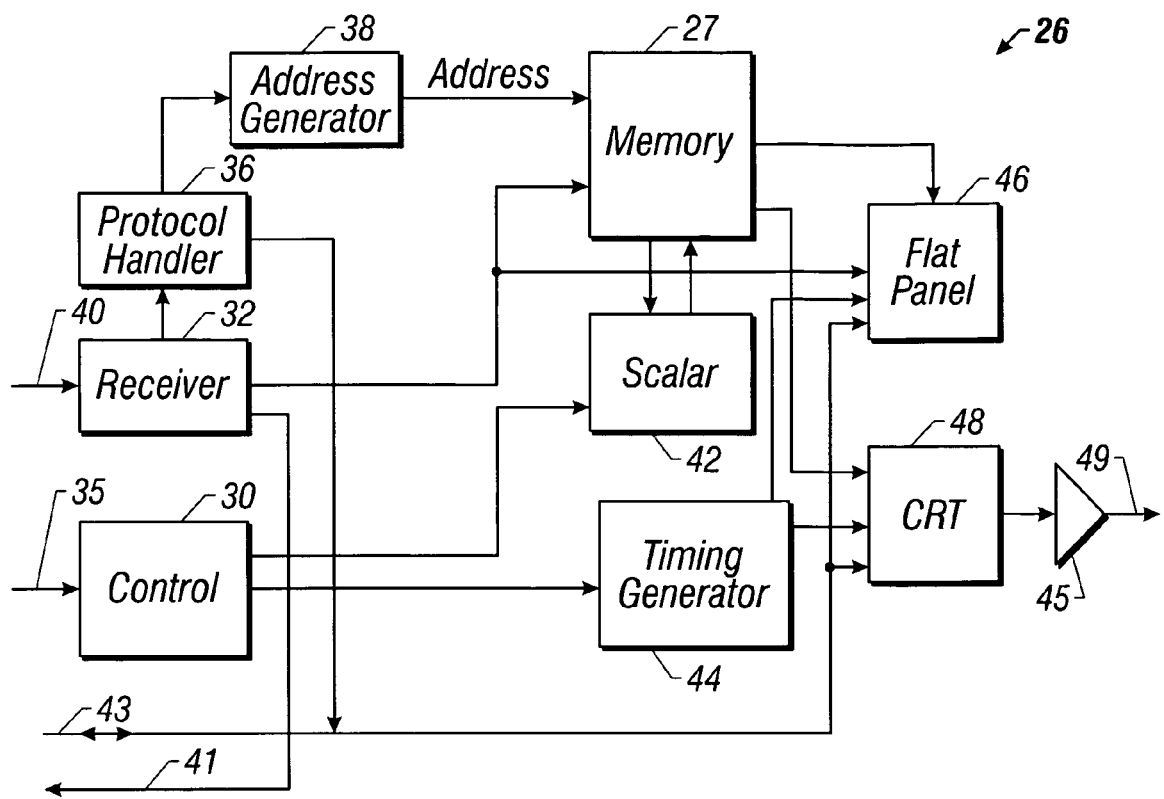
FIG. 3 shows a block diagram of an embodiment of a display device of the invention.

FIG. 3 shows a block diagram of the components of an embodiment of display device 26. Data is received at input 40, typically from communications channel 24, by receiver 32. Receiver 32 can then pass the data on to several places, depending on the configuration. If a daisy chain implementation is used, this data can be passed to the next display device at output 41. If receiver 32 decodes the address of display device 26, the associated data can be further decoded and processed. Protocol handler 36 can interpret various parts of the received data. For instance, it can decode memory location information from the received data and pass this information on to address generator 38, which selects the appropriate memory addresses in video memory 27 in which to store the associated video image data. Protocol handler 36 can also determine how the received data is formatted, for instance whether the data is formatted for a flat panel display or a CRT display. Other types of protocol or formatting information can be decoded and interpreted. The processing performed by protocol handler 36 will depend on the particular standards followed in the data transmitted from controller 22 to display device 26. Regardless of the standards used, the received video data can be separated into pixel address data and pixel content data, which are passed on to the appropriate circuits. For instance, the content and address data can be passed to video memory 27, which acts as a standard video refresh memory for either CRT 48 or flat panel 46. CRTs and flat panels may have different requirements, so the contents of video memory 27 can be configured for the particular display device being used. Timing generator 44 can output horizontal and vertical sync signals to CRT driver 48, which uses those signals to time the sending of the digitized video data stream from video memory 27 to digital-to-analog converter (DAC) 45. The DAC outputs an analog data signal to a CRT (not shown) on output 49.

Flat panel displays don't inherently require horizontal and vertical sync signals (although some are designed for it to make them compatible with CRT interfaces). Flat panels may accept individually addressable pixels, or may be designed to receive an entire row at a time. Therefore a different set of timing signals are sent to flat panel 46 to control the flow of video data from video memory 27 to flat panel 46. A typical display device will contain either a flat panel or a CRT, but not both. However, for flexibility and simplified manufacturing, the circuit shown in FIG. 3 can include the logic for both types of displays, allowing the same module to be used with either technology. This module can include an interface to a separate display device, such as a third party CRT or flat panel display, or can be incorporated into the display device itself.

Scalar circuit 42 permits adjustments to be made in the granularity of the displayed image, or parts of that image. The transmitted image and the displayed image should ideally contain enough pixel information to display all parts of the image at maximum resolution, with a one-to-one mapping between the pixels in the desired image and the pixels in the displayed image. However, it is sometimes desirable to degrade the granularity in the displayed image by allowing several contiguous pixels in the display to be identical. Although the image quality may be degraded, this technique can offer several advantages. One advantage is to reduce data traffic on communications channel 24 by allowing one transmitted pixel to update several contiguous displayed pixels, thus permitting more display devices to be updated, or more frequent updating of the same number of display devices, without increasing the bandwidth requirements of communications channel 24. Alternately, this technique can be used to communicate a higher-resolution image to a lower-resolution display device. In either case, scalar circuit 42 can accommodate various levels of granularity by adjusting the pixel-to-pixel resolution of the image stored in video memory 27.

Scaling also permits the height-to-width ratio (aspect ratio) of the display to be adjusted, either in physical dimensions or in number of pixels. Computer displays often assume a 640×480 display format (4×3 aspect ratio) when first booting, but then switch to a higher resolution format such as 1280×1024 (5×4 aspect ratio). The physical display device may also be designed for a particular aspect ratio that is different than the image being transmitted to it Such differences can cause distortion in the displayed image. Scalar circuit 42 can overcome this distortion.

Control circuit 30 can be used to control the operating configuration of display device 26 by controlling the configuration of scalar circuit 42 and timing generator 44. Relevant control information can be communicated to control circuit 30 through input 35. The type of information delivered over input 35 is typically only necessary when the device or system is being initialized, so input 35 can be designed for an inexpensive, low bandwidth communications channel. In one embodiment, input 35 uses the Inter-Integrated Circuit (I2C) protocol.

Since each display device has its own control circuit 30, each display device on communications channel 24 can be configured for a different protocol or data format. As long as each display device can identify the device address in an incoming message, the format or protocol of the remainder of the message does not have to be the same for all messages on channel 24. This permits great flexibility by allowing significantly different types of display devices to share the same communications channel.

The invention can also be backwards-compatible with conventional display technologies. Line 43 can pass conventional signals directly to the CRT or flat panel, bypassing the remaining circuitry. This line can also be used as a backchannel to communicate information from display device 26 back to the graphics controller. If the display is not being directly driven, then this line is available for backchannel use. However, even if it is being used to drive a CRT, a sync line can be used for backchannel communications during those intervals when it is not transmitting a sync signal.

By combining these various features, all the aforementioned interface functions can be implemented through one conventional connector.

Figure 4:
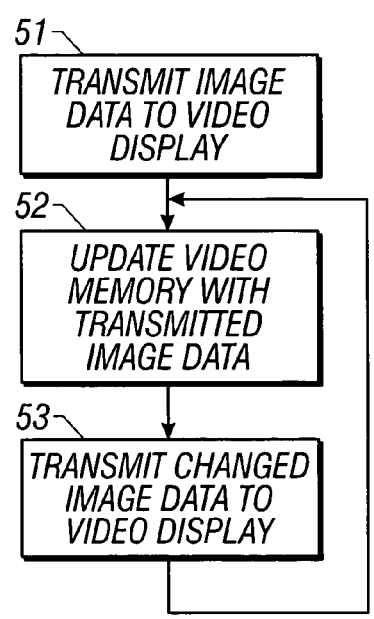
FIG. 4 shows a flow chart of an embodiment of the image update process.

FIG. 4 shows a simplified update process. The initial image data is transmitted to the video display at block 51, and that image data is written into the video memory at block 52 to establish the initial image. In a subsequent transmission, the image data for the changed portion of the image is transmitted to the video display at block 53, and that data is used to update only the affected areas of the video memory at block 52. Each subsequent transmission to that display device will update only the changed portions of the image by cycling through blocks 53 and 52. The initial image data and the changed image data will typically differ only in the amount of the display that they change (total image change versus partial image change.

In addition to the aforementioned features, communications channel 24 can also be used to communicate non-video information to individual display devices 26, 28. In one embodiment, audio data can be delivered to a display device at various intervals. Such delivery can be at regular intervals or can be irregular intervals, in the same way that video updates can be at regular or irregular intervals. This non-video data can be identified with a separate device address which is decoded by the video display device, or it can use the same device address as the video data and be identified as non-video data through some other indicator within the data message. Alternately, non-video data can be addressed to separate non-video devices (such as audio players) that share communications channel 24 with the video display devices.

When video and audio data are sent with separate addresses, they must be synchronized at the display to avoid timing disparities that are obvious to the viewer, so presentation of the audio data and video data must be coordinated in time even if they are transmitted at different times. This is accomplished by time-stamping each transmission with its relative display time, so that the video and audio data can be matched in time before presentation. This technique can be used for any type of multiple transmissions whose presentations must be synchronized in time.

Broadcast addresses can also be implemented, allowing a message with a global address to be decoded and implemented by many (or all) devices on the channel. This feature is useful for initialization or shutdown commands, in which every device on the channel is directed to reset itself to a predetermined state. It can also be used for any situation in which multiple devices need to receive an identical message.

The use of device addresses on the video channel allows extensible additions to be defined at the transport layer of the communications channel, greatly increasing the flexibility of what would otherwise be only a simple video channel. Using the aforementioned techniques, multiple devices can share a single communications channel 24 controlled through a single communications port in the graphics controller 22. These devices can perform both video and non-video functions as individually directed by the graphics controller 22.

The foregoing description is intended to be illustrative and not limiting. Other variations will occur to those of skill in the art. Such variations are encompassed by the invention, which is limited only by the spirit and scope of the appended claims.

I claim:

1. A method, comprising:
   identifying, by a video controller, a first updated portion of first video image data that has changed since a previous transmission to a first display device;
   transmitting the first updated portion of the first video image data from the video controller to the first display device;
   identifying, by the video controller, a second updated portion of second video image data that has changed since a previous transmission to a second display device; and
   transmitting the second updated portion of second video image data from the video controller to the second display device,
   wherein the first updated portion and the second updated portion are transmitted over a shared communication channel coupled between the video controller, the first display device and the second display device.

2. The method of claim 1, further comprising refreshing a first displayed image in the first display device from a first video memory of the first display device.

3. The method of claim 1, wherein transmitting the first updated portion is repeated at regular intervals.

4. The method of claim 1, wherein the first portion and the second portion are formatted differently.

5. The method of claim 1, wherein the first portion and the second portion are formatted alike.

6. The method of claim 1, wherein the first portion includes an address to identify the first video device and the second portion includes an address to identify the second video device.

7. The method of claim 1, further comprising:
   transmitting a third portion of the first video image data to the first display device;
   time-stamping the first and third portions before transmission; and
   synchronizing a presentation of the first and third portions based on the time-stamping.

8. A system, comprising:
   a shared communication channel;
   a first display device coupled to the shared communication channel and having a first video memory contained within the first display device;
   a second display device coupled to the shared communication channel and having a second video memory contained within the second display device; and
   a video controller coupled to the shared communication channel to transmit an identified, first updated portion of first video image data that has changed since a previous transmission to the first display device over the shared communication channel to the first display device, and to transmit an identified, second updated portion of second video image data that has changed since a previous transmission to the second display device over the shared communication channel to the second display device.

9. The system of claim 8, wherein:
   the first display device includes a first address decoder to decode a first device address associated with the first updated portion of first video image data received over the shared communication channel; and
   the second display device includes a second address decoder to decode a second device address associated with the second updated portion of second image video data received over the shared communication channel.

10. The system of claim 9, further comprising a non-display device coupled to the shared communication channel to receive non-video data.

11. The system of claim 9, wherein the first and second address decoders each decode a broadcast address in a broadcast message to be processed by the first and second display devices.

12. The system of claim 8, wherein the shared communication channel comprises a bus.

13. The system of claim 8, wherein the shared communication channel comprises a daisy chain.

14. The system of claim 8, wherein the first display device comprises:
an interface coupled to the shared communication channel;
a video memory coupled to the interface, the interface to update the video memory if an address associated with an updated portion of video image data over the shared communication channel matches an address of the first display device; and
a control circuit to refresh a displayed image in the first display from the first video memory.

15. The system of claim 8, wherein the second display device comprises:
an interface coupled to the shared communication channel;
a video memory coupled to the interface, the interface to update the video memory of the second display device if an address associated with an updated portion of video image data over the shared communication channel matches a display device address; and,
a control circuit to refresh a displayed image in the second display device from the video memory.

16. The method of claim 1, further comprising:
updating a video memory of the first display device if an address associated with an updated portion of video image data received over the shared communication channel matches a first display device address.

17. The method of claim 1, further comprising:
updating a video memory of the second display device if an address associated with an updated portion of video image data received over the shared communication channel matches a second display device address.

18. The method of claim 16,
wherein updating the first video memory is repeated at irregular intervals; and
wherein said irregular intervals are based on detecting a change in the first video image data since the previous transmission to the first display device.

19. The system of claim 8, wherein the first display device includes a protocol handler to interpret the first video data.

20. The system of claim 8, wherein the first display device includes a timing generator to generate timing signals for a display.

21. The system of claim 20, wherein the first display device includes a control circuit to configure the timing generator.

22. The system of claim 8, wherein the first display device includes a scalar circuit to change a granularity of video image.

23. The system of claim 22, wherein the first display device includes a control circuit to configure the scalar circuit.

24. The system of claim 8, wherein the first display device includes a display interface to at least one of a CRT and a flat panel.

25. The system of claim 8, wherein the first display device includes at least one of a CRT and a flat panel.

* * * * *